(12) United States Patent
Mantych et al.

(10) Patent No.: US 7,748,486 B2
(45) Date of Patent: Jul. 6, 2010

(54) LANDING GEAR FOR A HOVERCRAFT

(75) Inventors: Glen A. Mantych, Placitas, NM (US);
Emray R. Goossen, Albuquerque, NM (US)

(73) Assignee: Honeywell International, Inc., Morristown, NJ (US)

( * ) Notice: Subject to any disclaimer, the term of this patent is extended or adjusted under 35 U.S.C. 154(b) by 774 days.

(21) Appl. No.: 11/431,792

(22) Filed: May 10, 2006

(65) Prior Publication Data

US 2007/0051848 A1    Mar. 8, 2007

Related U.S. Application Data

(60) Provisional application No. 60/688,911, filed on Jun. 9, 2005.

(51) Int. Cl.
*B64C 25/00* (2006.01)

(52) U.S. Cl. .................. 180/119; 180/116; 446/64; 244/100 R

(58) Field of Classification Search .......... 180/116, 180/117, 118, 119; 244/158.1, 108, 100 R, 244/7 B; 446/36, 34, 55, 64; 248/188.1, 248/188.6, 188.7
See application file for complete search history.

(56) References Cited

U.S. PATENT DOCUMENTS 3,144,223 A * 8/1964 Nichols .................. 244/100 R
3,173,632 A * 3/1965 Woods .................... 244/100 R
3,857,533 A * 12/1974 Mason .................... 244/17.17
4,270,711 A * 6/1981 Cresap et al. ............ 244/17.17
4,519,559 A * 5/1985 Logan et al. ............. 244/17.17

(Continued)

FOREIGN PATENT DOCUMENTS

EP    1 193 168 A2    4/2002

(Continued)

OTHER PUBLICATIONS

International Preliminary Report on Patentability, from corresponding PCT Application Serial No. PCT/US2006/021906, mailed Dec. 27, 2007, 6 pages.

(Continued)

*Primary Examiner*—Tony H. Winner
(74) *Attorney, Agent, or Firm*—Shumaker & Sieffert, P.A.

(57) ABSTRACT

Self-leveling legs are used to accommodate landing a ducted fan hovercraft on a sloped surface such as a roof-top. These legs move to accommodate a variation of slope within their range of motion irrespective to the azimuth of the vehicle body. The configuration and operation of the landing legs allow the hovercraft to land in a stable fashion with the hovercraft vehicle body maintained in a vertical orientation. The basic kinematics of the present invention is the displacement of one landing leg upwards is connected by a horizontal member to the opposite leg and displaces it downwards, and visa-versa. Planar surface contact is accomplished by the unique curvature of the legs and the splay of the legs from the vehicle body.

12 Claims, 5 Drawing Sheets

U.S. PATENT DOCUMENTS

| | | | | |
|---|---|---|---|---|
| 4,544,116 A | * | 10/1985 | Shwayder | 244/108 |
| 5,358,201 A | * | 10/1994 | Brown, Sr. | 244/108 |
| 5,381,988 A | * | 1/1995 | Kattas | 244/153 A |
| 6,502,787 B1 | | 1/2003 | Barrett | |
| 7,226,395 B2 | * | 6/2007 | Wu et al. | 482/57 |

FOREIGN PATENT DOCUMENTS

WO     WO 00/40464     7/2000

OTHER PUBLICATIONS

Notification of Transmittal of International Search Report and Written Opinion, from corresponding PCT Application Serial No. PCt/US2006/021906, mailed Oct. 24, 2006, 10 pages.

G,H, Elkaim, "Robotica Exotica: Honeywell Micro Air Vehicle", retrieved from the internet: URL:http://apps.soc.ucsc.edu/elkaim/archives/000236.html, Jan. 14, 2005, 1 pg. (Figure not available).

* cited by examiner

LANDING GEAR FOR A HOVERCRAFT

CROSS-REFERENCE TO RELATED APPLICATIONS

This application is based on U.S. Provisional Application Ser. No. 60/688,911 entitled "Means for Landing a Hover-Craft on a Sloped Surface", filed on Jun. 9, 2005, the teachings of which are incorporated herein by reference.

GOVERNMENT RIGHTS

The U.S. Government has a paid-up license in this invention and the right in limited circumstances to require the patent owner to license others on reasonable terms as provided for by the terms of HR0011-05-C-0043 awarded by the Defense Advanced Research Project Agency.

BACKGROUND OF THE INVENTION

1. Field of the Invention (Technical Field)

The present invention relates to landing gear and more particularly to a landing gear or landing mechanism for a micro air-vehicle (MAV) or hovercraft that allows vehicles to land on sloped or uneven surfaces while maintaining the vertical orientation of the hovercraft body.

2. Background Art

Presently there are no solutions to the problem of landing a hovercraft on a sloped surface. This problem is particularly critical for a hovercraft due to the operation of the ducted fan assembly, which needs to be in a substantially vertical orientation to operate correctly.

Presently, spring loaded vertical legs are being used as landing gear for aircraft such as the lunar landing module (LLM). The LLM vertical legs are spring loaded so as they compress they are applying torque to the vehicle, which is attempting to maintain a true vertical orientation.

Another prior art method for providing a landing gear for an aircraft on uneven surfaces is a "wineglass" base that articulated from a single ball joint. The ball joint "wineglass" mechanism needs some form of locking mechanism at the ball joint to maintain stability and a complex mechanism to maintain the vertical orientation of the ducted fan assembly.

Further, the prior art approaches add an extraordinary amount of weight to the hovercraft, and due to the complexity of the devices, are subject to failure.

SUMMARY OF THE INVENTION

Disclosure of the Invention

A hovercraft, while landing on a sloped surface, is required to maintain a vertical orientation of the vehicle body because stable hover of a ducted fan craft can only be maintained with the thrust directed downward. If a hovercraft is required to adopt a non-vertical orientation of the vehicle body to facilitate landing, sideways translation will occur destabilizing the landing process. The present invention consists of a unique curvature of the landing legs, providing for simultaneous contact with a planar surface irrespective of the angle of the slope of the landing surface or the azimuth rotational position of the vehicle body, provided the slope is within the range of motion of the mechanization. Due to the unique curvature and splaying of the landing legs, the hovercraft can maintain its orientation of various uneven surfaces. For example, contact with a first sloped or stepped surface for a first landing leg causes an equal and opposite orientation of the second landing leg, both landing legs forming a one piece unit.

A primary object of the present invention is to provide a self-leveling landing gear for a hovercraft.

A primary advantage of the present invention is its simple passive operation.

Another advantage of the present invention is that it is lightweight.

Yet another advantage of the present invention is that it is compliant.

Another advantage of the present invention is that it is stable.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

Figure 1:
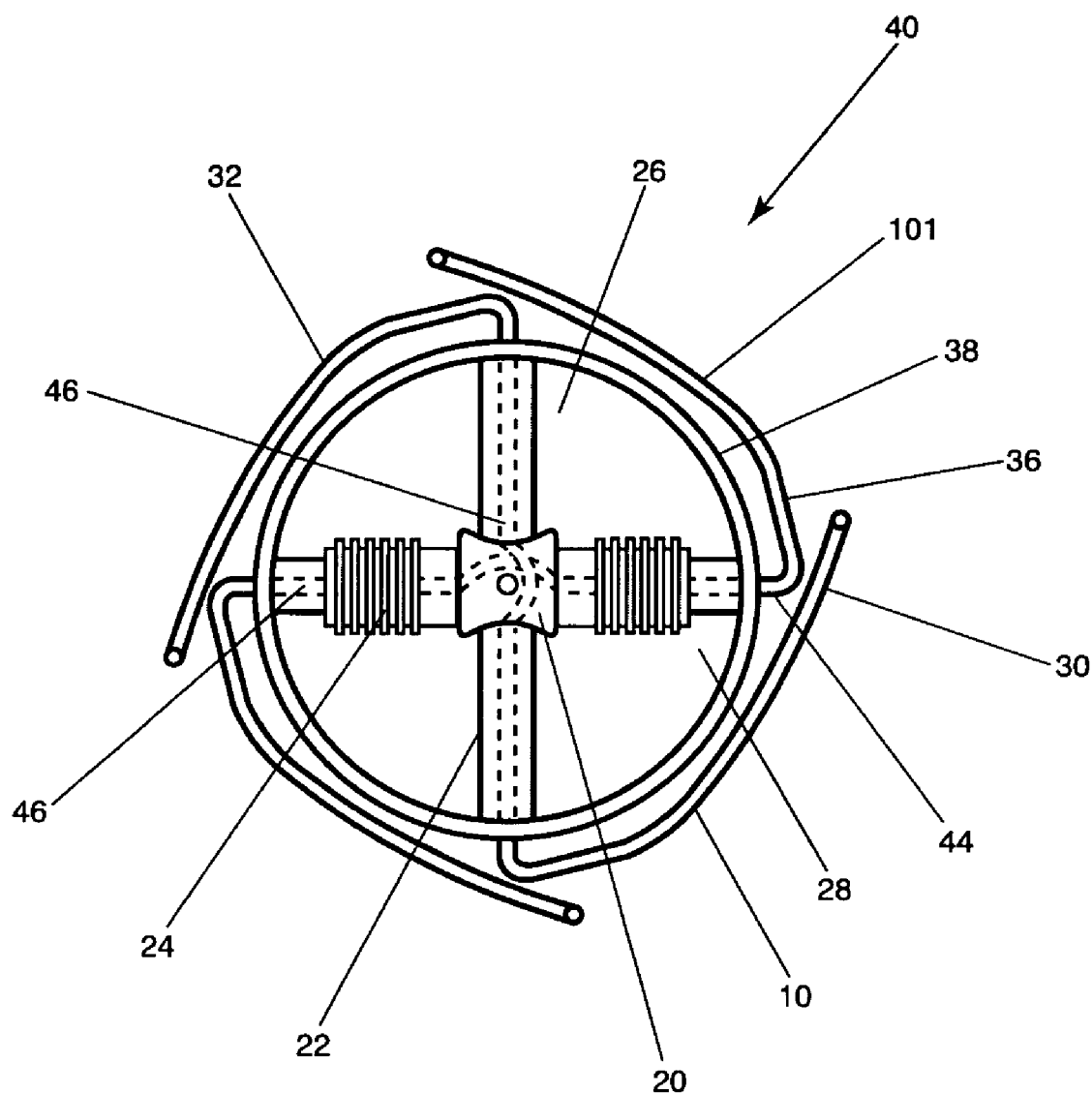
FIG. 1 shows a top view of the preferred embodiment of the invention.
Figure 2:
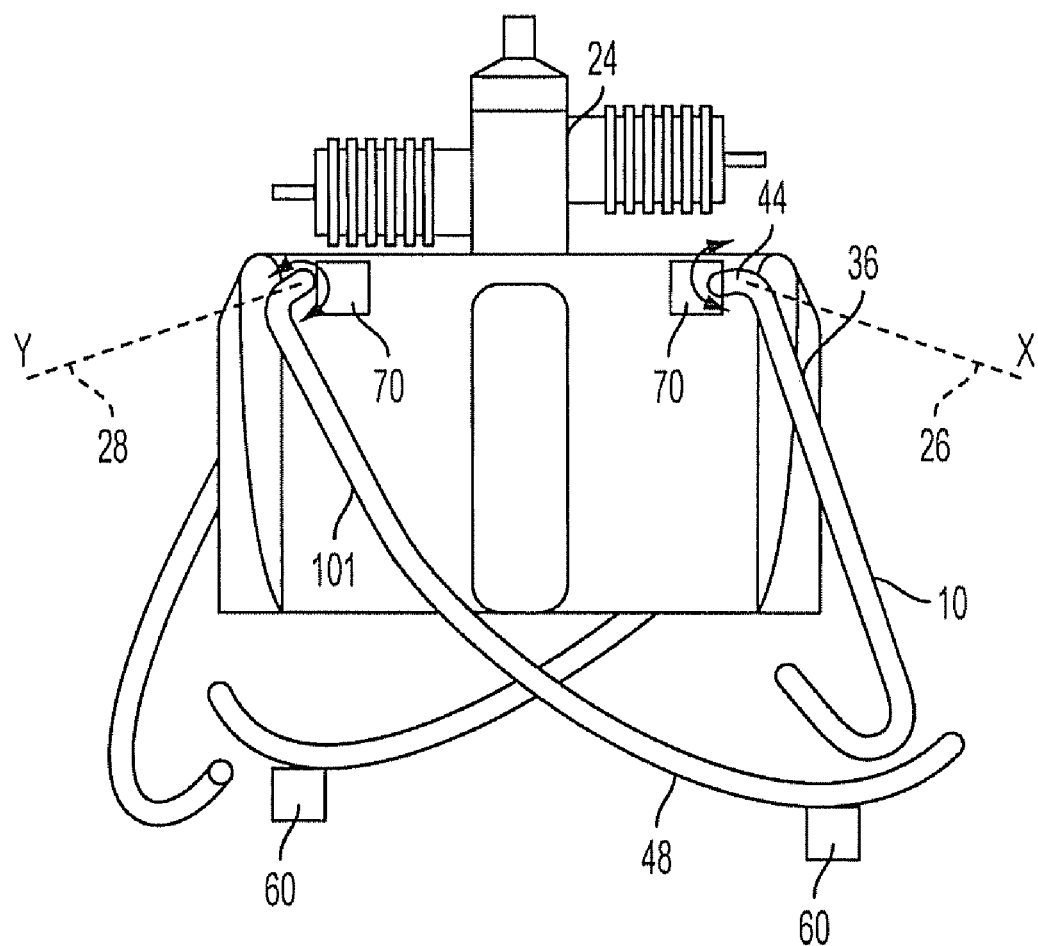
FIG. 2 is a side view of the embodiment of FIG. 1.
Figure 3:
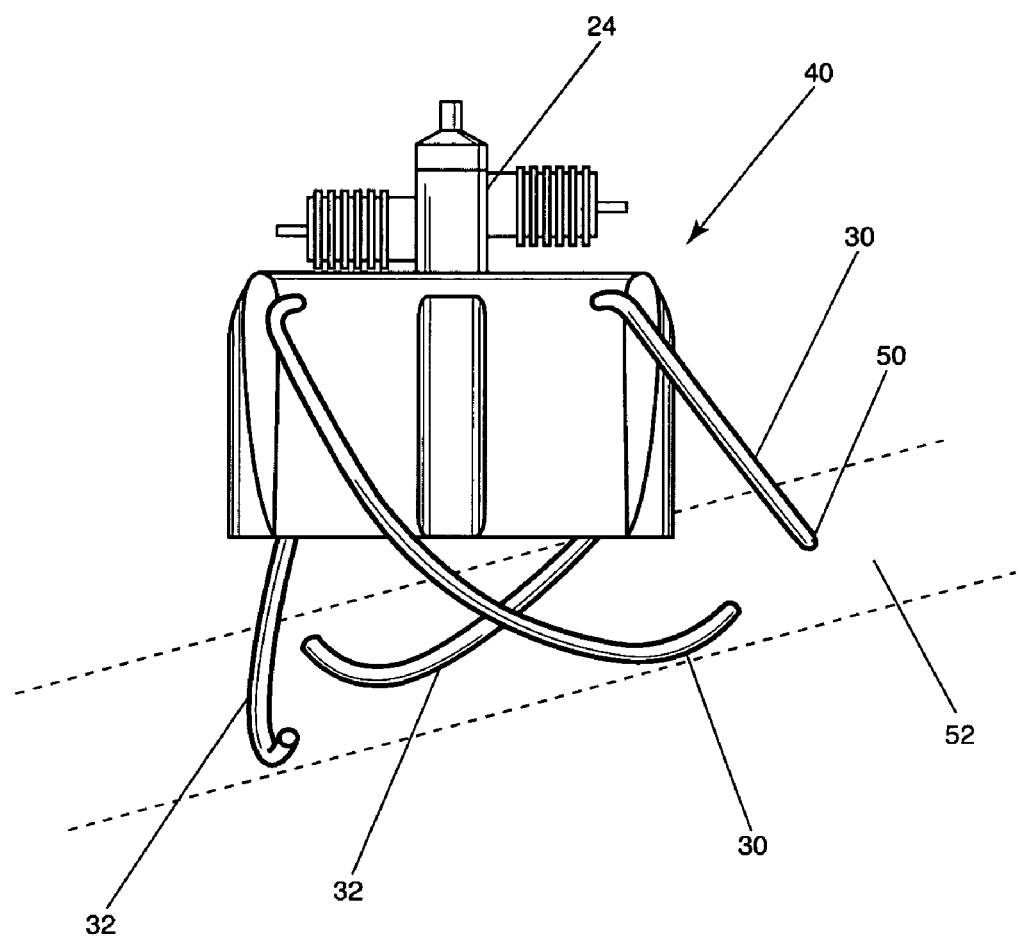
FIG. 3 shows the embodiment of FIGS. 1 and 2 on a sloped surface.
Figure 5:
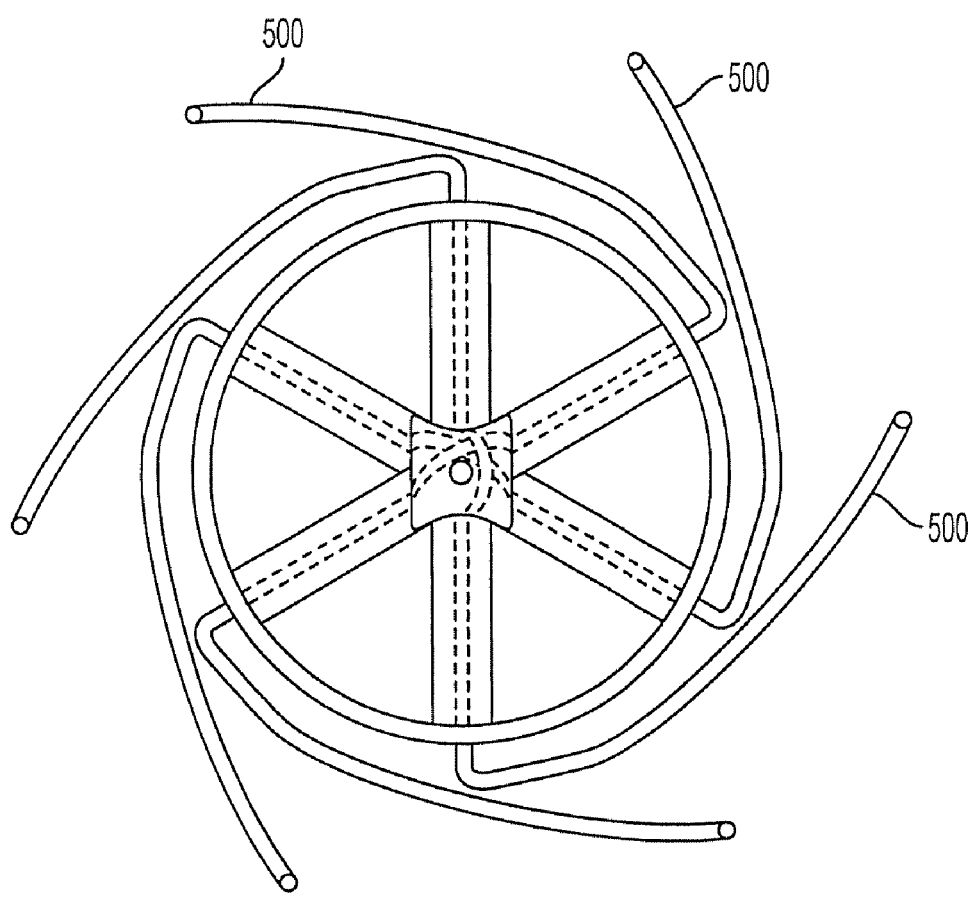
FIG. 5 shows an embodiment of the invention with three pair of landing legs at sixty degree spacing.

The present invention is a set of self-leveling legs for hovercraft 40 or other type of vehicle that maintains the vertical orientation of the hovercraft on an uneven or sloped surface. The preferred embodiment of the invention is shown in FIGS. 1 and 2. FIG. 1 shows a top view of the hovercraft with the preferred landing gear. FIG. 2 shows a side view of the embodiment of FIG. 1. In this embodiment two pair of landing leg assemblies 10 and 10' are shown crisscrossing near the center of hovercraft 20 with offsets to clear the motor shaft. As show in FIG. 1 landing leg assemblies 10 and 10' can be inserted or disposed within cross bars 22 or the like which act as motor mounts for attaching a motor 24. Landing leg assembly 10 needs to rotate about the X axis 26 and landing leg assembly 10' about Y axis 28. The basic kinematics of the present invention is the displacement of one landing leg 30 upwards is connected to the opposite leg 32 and displaces it downwards, and vise versa. Thus, as clearly shown in FIG. 3, when hovercraft 40 lands on an inclined surface, the outer end of leg 32 contacts the surface, causing leg assembly to rotate, which in turn causes leg 30 to contact the surface on an inner portion of leg 30, while hovercraft 40 maintains its vertical orientation. This movement by the corresponding leg assemblies 10 and 10' is accomplished by the unique curvature and splaying of legs 30 and 32. Below is a description of a single landing leg; however, each of the landing legs are substantially similar, this description is intended to cover all landing legs. In addition, FIG. 1 depicts two pair of landing legs, at ninety degrees (90°), three pair are also possible at sixty degrees (60°) spacing. FIG. 5 depicts three pair 500 of landing legs at sixty degrees spacing. To accommodate three pair, the splay can be increased and/or the size of the legs can be shortened to optimize the functionality of the legs and to prevent overlap of the legs. As best seen in FIG. 1, horizontal members 46 cross as shown and are disposed in hovercraft 40 as shown. Horizontal members 46 exceed a width of the diameter of hovercraft 40 by a predetermined dimension 44. Landing leg 32 provides an approximate forty-five degree (45°) bend from horizontal members 46 to top portion 36 of landing leg 32 or forty-five degrees (45°) from vertical of hovercraft 40 when disposed on a level surface. This bend is in a first direction for leg 32 and equal and opposite direction for leg 30. Top portion 36 of landing leg 32 is a substantially straight running member parallel to outer body 38 of hovercraft 40 when fully extended in the vertical direction. Top portion 36 has a predetermined length substantially similar to a length of hovercraft 10. This prevents landing legs 32 from contacting outer body 38 when leg 32 is moved. Leg bottoms 48 each contain a substantially similar quasi semi-circular design.

Both curved landing legs 30 and 32 and torsion bar elements are required. In an alternative embodiment, the torsion connecting bar between each leg pair could be substituted by any manner of devices that would cause the equal and opposite movement. These devices can include hydraulic cylinders, pulleys and cables, or a complicated electronic control system driving actuators (not shown).

Figure 4:
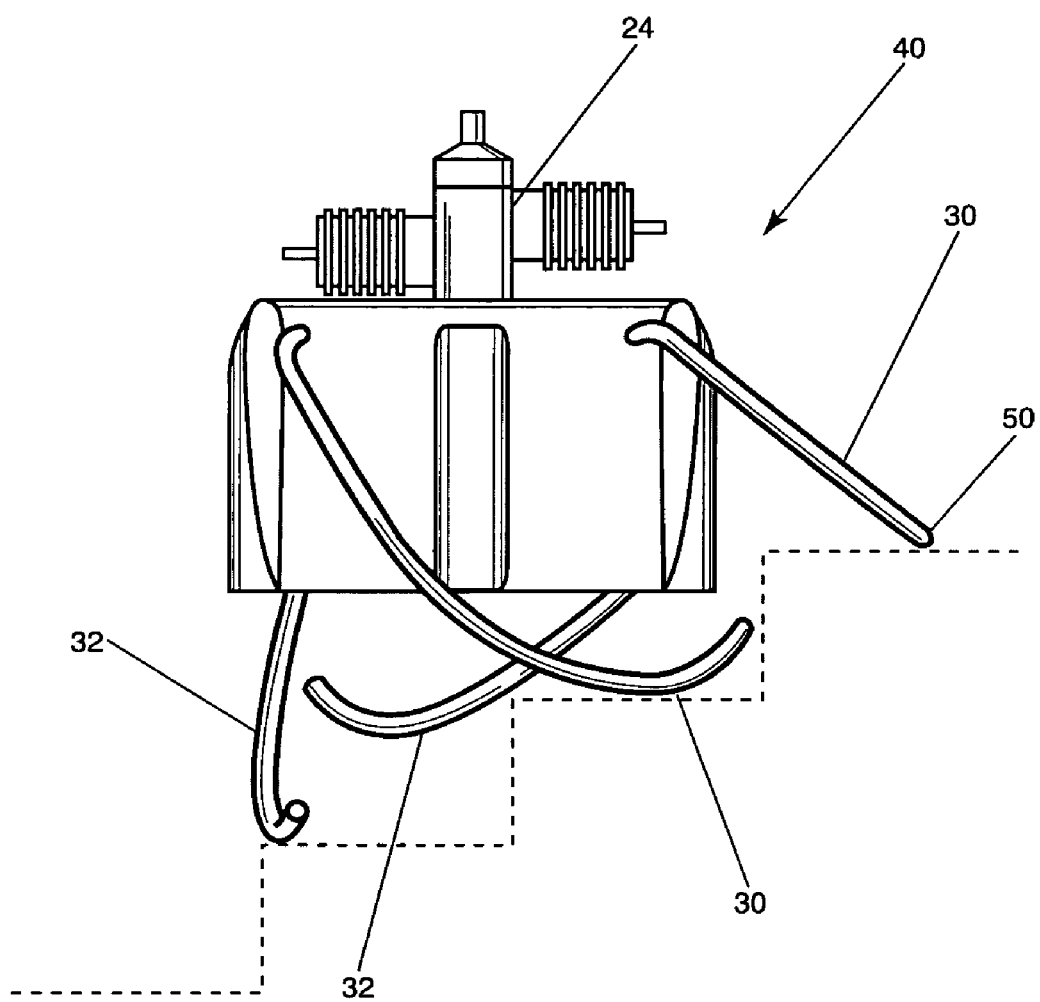
FIG. 4 shows the embodiment of FIGS. 1 and 2 on a stepped surface.

As shown in FIG. 4, as hovercraft 40 lands one or more legs 30 contact the highest point 50 of the landing surface 52 and cause landing legs 30 and 32 to move as craft 40 descends. This motion ceases once the opposing leg 32 on each leg assembly 10 and 10' contacts the landing surface 52. The unique curvature of the landing legs 30 and 32 enables contact with a planar surface irrespective of the azimuth of vehicle body 40 with respect to landing surface 52 and irrespective of the slope of the landing surface. To keep landing legs 30 and 32 from slipping when on a sloped surface a sharply serrated or rubberized or resilient material could be applied to leg bottoms 48. For example, anti-slip mechanism 60 could be applied to leg bottoms 48, as shown in FIG. 2.

A limitation to the operation of the present invention is the practical sizing of the landing legs 30 and 32, their splay from the vehicle body 10 and height of the vehicle body above the landing surface limits the kinematic motion such that accommodating a sloped surface in excess of thirty degrees (30°) is undesirable.

Locking features, such as locking feature 70, can be added to the landing legs so that when the hovercraft engine is shut off, the landing legs cannot move. The merit derived from locking the landing legs would be to prevent the hovercraft from being tilted by a strong wind gust while the engine is shut off.

Although this disclosure is directed to a hovercraft application, this invention can be used for any application where it is desired to maintain verticality of an item that is set on a sloped surface. For example, any open container of a liquid, if fitted with these curved legs, could be set on a sloped surface and not spill.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A landing mechanism for maintaining a vertical orientation of a vehicle body on sloped or uneven surfaces, the landing mechanism comprising:
at least two self leveling leg assemblies, each leg assembly comprising a rotating cross member affixed to a first leg and a second leg, said first leg comprising a predetermined quasi semi-circular configuration with a curvature in a first direction and the second leg comprising a substantially similar quasi semi-circular configuration with the curvature in a second and opposite direction, wherein a first leg assembly of said at least two leg assemblies rotates in a first axis and a second leg assembly rotates in a second axis, wherein the first axis is different than the second axis.

2. The landing mechanism of claim 1 further comprising splaying the first leg and the second leg of each leg assembly from the vehicle body.

3. The landing mechanism of claim 1 wherein said first leg assembly is disposed on the vehicle body ninety degrees (90°) from said second leg assembly.

4. The landing mechanism of claim 1 wherein said rotating cross member comprises a horizontal member.

5. The landing mechanism of claim 4 wherein said horizontal member comprises a member from the group consisting of a torsion bar, hydraulic cylinders, pulleys and cables and an electronic control system driving actuators.

6. The landing mechanism of claim 1 wherein said curvature in a first direction comprises a plus forty-five degree (+45°) bend from a top portion of said first leg and said curvature in a second direction comprises a minus forty-five degree (−45°) bend from a top portion of said second leg.

7. The landing mechanism of claim 1 further comprising an anti-slip mechanism disposed on said first leg and said second leg.

8. The landing mechanism of claim 1 further comprising a landing leg assembly lock.

9. The landing mechanism of claim 1 wherein said at least two leg assemblies comprise three leg assemblies.

10. The landing mechanism of claim 9 wherein said three leg assemblies are disposed on the vehicle body with a first leg assembly disposed sixty degrees (60°) from a second leg assembly and a third leg assembly disposed sixty degrees (60°) from said second leg assembly.

11. A method of maintaining a vertical orientation of an object when disposed on an uneven surface, the method comprising:
providing at least two leg assemblies disposed on said object, each leg assembly comprising a rotating cross member affixed to a first leg, said first leg comprising a predetermined quasi semi-circular configuration with a curvature in a first direction and a second leg comprising a substantially similar quasi semi-circular configuration with the curvature in a second and opposite direction, wherein a first leg assembly of said at least two leg assemblies rotates in a first axis and a second leg assembly rotates in a second axis, wherein the first axis is different than the second axis;

disposing the object on the uneven surface wherein the first leg contacts a first portion of the uneven surface; and rotating the rotating cross member wherein the second leg contacts a second portion of the uneven surface.

12. The method of claim 11 further comprising the step of locking the at least two leg assemblies.

* * * * *